3,328,164
PREALLOY FOR THE TREATMENT OF IRON
AND STEEL MELTS
Horst Mühlberger and Heiner Alfred Träger, Frankfurt am Main, Germany, assignors to Metallgesellschaft Aktiengesellschaft, Frankfurt am Main, Germany, and Süddeutsche-Kalkstickstoff-Werke Aktiengesellschaft, Trostberg, Upper Bavaria, Germany
No Drawing. Filed Sept. 4, 1963, Ser. No. 306,613
Claims priority, application Germany, Sept. 20, 1962, M 54,272
3 Claims. (Cl. 75—168)

The present invention relates to improved prealloys for the treatment of iron and steel melts for the production of cast iron with spheroidal graphite, for the deoxidation or desulfurization of cast iron, as well as for the deoxidation of steels and for the production of semisteels in which the graphite which separates out upon cooling is in spheroidal form.

Prealloys containing up to 40% of magnesium, various amounts of calcium and the remainder essentially silicon and, if desired, iron have been used for the treatment of iron and steel melts, especially for the introduction of magnesium in the production of cast iron with spheroidal graphite. It is furthermore known to add rare earth metals, especially misch metal, to cast iron melts from which cast iron with spheroidal graphite is to be produced. Such additions of rare earth metals in large quantities are supposed to cause formation of spheroidal graphite as in the addition of magnesium, however, the processes employing addition of such rare earth metals have not been introduced in practice. In addition, small quantities of rare earth metals have been used in combination with magnesium in such a way that the magnesium causes the formation of the spheroidal graphite whereas the rare earth metals serve to counteract the action of disturbing elements, such as, titanium, which in certain instances hinder the formation of spheroidal graphite.

According to the invention it was found that prealloys with a magnesium content of 4–9%, a rare earth metal content of 3–7% and at least 40% of at least one of the metals silicon, nickel and copper and any remainder at least one of the metals iron, manganese and calcium are especially advantageous for the treatment of iron and steel melts and especially for the formation of spheroidal graphite in cast iron when the ratio of magnesium to rare earth metals in the prealloys is between 1:1 and 2.5:1. Such ratio should be nearer 1:1 with low magnesium concentrations and nearer 2.5:1 with higher magnesium concentrations. The iron, manganese and calcium are optional ingredients and therefore are not necessary ingredients of the alloys according to the invention. When calcium is present, its content must be sufficiently low that the ratio between magnesium and calcium is always greater than 2:1. Preferably, the alloys according to the invention contain 6–9% of magnesium, 5–7% of rare earth metals, as well as 1–3% of calcium, the ratio of magnesium to rare earth metals again being between 1:1 and 2.5:1 as indicated above. In the above and in the following the proportions of the prealloy components are given by weight unless otherwise indicated.

The prealloys according to the invention, in addition to being suited for the production of cast iron with spheroidal graphite, are also suited for the deoxidation and desulfurization of cast iron without striving for the formation of spheroidal graphite. In addition, the prealloys can be used to treat the so-called semisteels with a carbon content between 0.9 and 1.7% in order that the graphite which separates out on cooling separates out in spheroidal form, whereby the strengths and toughness are especially improved. Finally, the prealloys according to the invention can also be used for the deoxidation of steels, especially high alloy steels with high nickel and chromium contents. The use of such prealloys in this manner leads to an especially high toughness and therefore to better workability and malleability. Nickel containing prealloys according to the invention are especially suited as they simultaneously can serve to introduce the desired nickel into the steel.

In use of the prealloys according to the invention it was unexpectedly found that due to the presence of the rare earth metals the magnesium yield (effectiveness) of the prealloys is increased very substantially. The cause therefor is not fully understood. The increases in yields from the magnesium in the alloys according to the invention in individual cases amounted up to 80% and as an average are between 40 and 70%. As a result, substantially lower quantities of the prealloy for the treatment of iron and steel melts suffice than when the same alloys are used but without a rare earth metal content. The decrease in the quantity of the prealloy required not only results in the saving engendered by the use of such smaller quantities but also decreases the temperature loss engendered by the addition of the prealloy. In addition, a too rapid decline in the effectiveness of the magnesium treatment is avoided and consequently the melt can be cast over a longer period of time.

The increase in magnesium yield is of advantage in all instances in which the prealloys according to the invention can be used. This is also true when they are used for the deoxidation and desulfurization of cast iron or for the deoxidation of steels when formation of spheroidal graphite is not striven for as in these cases also the quantity of rare earth metal containing alloy required to obtain the same effect is less than when the prealloy does not contain the rare earth metal. The increase in magnesium yield is of great significance in the treatment of semisteels and the deoxidation of steels in view of the high treating temperatures of over 1570° C. In view of the rare earth metal content the magnesium is more strongly bound which results in that the magnesium vaporization is under better control and that the reaction proceeds under better control so that the use of such prealloys is easier.

It is critical for the prealloys according to the invention that the indicated ratio between the magnesium and the rare earth metals be maintained. If the ratio is too low or, in other words, the quantity of rare earth metals in relation to the magnesium content is too high, certain and complete spheroidal graphite formation can no longer be attained, especially when cast iron with a high sulfur content is to be treated. In addition, in all applications, the reaction of the magnesium, especially in large charges, is retarded too much whereby the reaction products are no longer reliably removed from the melt. If the proportion of the rare earth metals is below that indicated, the advantages described above, especially the increase in magnesium yield, are not attained.

The prealloys according to the invention can be incorporated in the iron or steel melt to be treated in a simple manner, for example, by throwing it onto the melt or by placing it in the empty treating ladle and pouring the melt to be treated thereover. The latter procedure is preferred when large charges of steel are to be treated.

The rare earth metals are present in the prealloys in metallic form and in general as lanthanides, primarily as cerium and lanthanum. They are best introduced into the prealloys during the production of the latter in a known manner by reduction of rare earth metal compounds.

The following examples will serve to illustrate the increase in magnesium yield in prealloys according to the invention in the production of cast iron containing spheroidal graphite.

In each example a melt of crude iron of the following composition:

3.6% C
0.015% S
1.9% Si
0.008% Mn
Remainder essentially Fe was poured at 1470° C. into a pouring ladle containing a prealloy of the following composition:

7% Mg
6% misch metal
3% Ca
35% Fe
Remainder silicon and subsequently cast.

The following results were obtained:

| Example | 1 | 2 |
| --- | --- | --- |
| Weight of iron melt, in kg | 10 | 8 |
| Quantity of prealloy added, in percent | 1.44 | 1.8 |
| Mg content in casting | 0.059 | 0.079 |
| S content in casting | <0.01 | <0.01 |
| Mg yield, in percent | 71 | 72 |

We claim:

1. A prealloy adapted for the treatment of iron and steel melts essentially consisting of 4 to 9% of magnesium, 3 to 7% of rare earth metals, at least 40% of at least one metal selected from the group consisting of silicon, nickel and copper, 1 to 3% of calcium and any remainder at least one metal selected from the group consisting of iron and manganese, the ratio of magnesium to rare earth metals being between 1:1 and 2.5:1 and the quantity of calcium being such that the ratio of magnesium to calcium is greater than 2:1.

2. The prealloy of claim 1 in which the magnesium content is 6 to 9% and the rare earth metal content is 5 to 7%.

3. A prealloy adapted for the treatment of iron and steel melts essentially consisting of 6 to 9% of magnesium, 5 to 7% of rare earth metals, 1 to 3% of calcium, at least 40% of silicon and any remainder iron.

References Cited

UNITED STATES PATENTS

| | | | |
| --- | --- | --- | --- |
| 2,762,705 | 9/1956 | Spear | 75—130 |
| 2,792,300 | 5/1957 | Livingston | 75—168 X |
| 2,837,422 | 6/1958 | Motz et al. | 75—134 |
| 3,030,205 | 7/1959 | Millis | 75—168 X |
| 3,033,676 | 5/1962 | Cox | 75—130 |

DAVID L. RECK, *Primary Examiner.*

C. N. LOVELL, *Assistant Examiner.*